(12) United States Patent
Parmenter

(10) Patent No.: US 11,001,448 B2
(45) Date of Patent: May 11, 2021

(54) CONVEYOR LIFTGATE SYSTEMS AND METHODS

(71) Applicant: Walmart Apollo, LLC, Bentonville, AR (US)

(72) Inventor: Paul M. Parmenter, St. George, UT (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/714,086

(22) Filed: Dec. 13, 2019

(65) Prior Publication Data

US 2020/0189848 A1 Jun. 18, 2020

Related U.S. Application Data

(60) Provisional application No. 62/779,593, filed on Dec. 14, 2018.

(51) Int. Cl.
*B65G 13/12* (2006.01)
*B65G 21/12* (2006.01)
*B65G 43/00* (2006.01)
*B65G 13/00* (2006.01)

(52) U.S. Cl.
CPC ............ *B65G 13/12* (2013.01); *B65G 13/00* (2013.01); *B65G 43/00* (2013.01)

(58) Field of Classification Search
None
See application file for complete search history.

(56) References Cited

U.S. PATENT DOCUMENTS

| | | | | |
|---|---|---|---|---|
| 3,311,214 A | * | 3/1967 | Davis | B65G 49/0463 198/346.3 |
| 4,743,154 A | * | 5/1988 | James | B23P 19/041 198/412 |
| 4,790,921 A | * | 12/1988 | Bloomquist | C23C 14/505 118/500 |

(Continued)

FOREIGN PATENT DOCUMENTS

| | | |
|---|---|---|
| DE | 102006056079 | 5/2008 |
| EP | 1268323 | 1/2003 |

(Continued)

*Primary Examiner* — Kavel Singh
(74) *Attorney, Agent, or Firm* — Fitch, Even, Tabin & Flannery LLP

(57) ABSTRACT

In some embodiments, apparatuses and methods are provided herein useful to conveyor systems including liftgates. In some embodiments, a conveyor system including a liftgate comprises a conveyor section including a plurality of rollers, a liftgate section comprising a frame having a proximal end and a distal end and including sidewalls, a plurality of liftgate rollers positioned within the frame, a front bracket and a rear bracket, wherein the front bracket is positioned between the sidewalls toward the proximal end and the rear bracket is positioned toward the distal end, and wherein the rear bracket is pivotably affixed to the conveyor section, and an actuator affixed to the rear bracket and the front bracket configured to provide a linear force acting between the rear bracket and the front bracket, wherein the linear force causes the proximal end of the liftgate portion to raise with respect to the conveyor section.

19 Claims, 4 Drawing Sheets

(56) References Cited

U.S. PATENT DOCUMENTS

| | | | | |
|---|---|---|---|---|
| 6,409,011 | B1 * | 6/2002 | Ferguson | B65G 15/00 |
| | | | | 186/68 |
| 6,447,234 | B2 * | 9/2002 | Sinn | A01K 45/005 |
| | | | | 119/846 |
| 6,488,145 | B1 * | 12/2002 | Diego | B65G 13/00 |
| | | | | 198/581 |
| 7,299,915 | B2 * | 11/2007 | El-Ibiary | B65G 23/08 |
| | | | | 198/780 |
| 7,416,075 | B2 * | 8/2008 | Haustein | B65G 13/12 |
| | | | | 198/588 |
| 7,770,720 | B2 * | 8/2010 | Freudelsperger | B65G 21/00 |
| | | | | 198/861.5 |
| 8,596,944 | B2 * | 12/2013 | England | B65G 47/252 |
| | | | | 414/24.5 |
| 2005/0173226 | A1 | 8/2005 | Gold | |
| 2006/0011093 | A1 | 1/2006 | Jensen | |
| 2012/0031736 | A1 | 2/2012 | Swinderman | |
| 2014/0271069 | A1 | 9/2014 | Salichs | |

FOREIGN PATENT DOCUMENTS

| | | |
|---|---|---|
| WO | 2012140774 | 10/2012 |
| WO | 2015024072 | 2/2015 |

\* cited by examiner

CONVEYOR LIFTGATE SYSTEMS AND METHODS

CROSS-REFERENCE TO RELATED APPLICATIONS

This application claims benefit of U.S. Provisional Application No. 62/779,593, filed Dec. 14, 2018, which is incorporated by reference in its entirety herein.

TECHNICAL FIELD

This invention relates generally to conveyor systems and, more particularly, to powered liftgates for conveyor systems.

BACKGROUND

Conveyor systems are used in many industries to transport objects. For example, a package delivery surface may utilize conveyor systems to move and sort packages in a facility, a retailer may utilize a conveyor system to transport goods at a distribution center, etc. While conveyor systems are useful for moving objects about a facility, they are typically quite large and difficult to maneuver around. For example, if a person wishes to cross a conveyor (e.g., go from one side of the conveyor to another), the person must maneuver around the conveyor by, for example going above the conveyor (e.g., on a catwalk) or around the conveyor. Some conveyor systems include liftgates to make maneuvering about the facility easier. Such liftgates are sections of the conveyor system that lift to allow a person to cross the conveyor. While such liftgates are useful, they have many drawbacks. For example, the liftgates may be heavy and difficult to operate. Additionally, such liftgates can pose a safety risk. For example, a liftgate may fall on or otherwise trap a person. Consequently, a need exists for improved liftgates.

BRIEF DESCRIPTION OF THE DRAWINGS

Disclosed herein are embodiments of systems, apparatuses, and methods pertaining to conveyor systems including liftgates. This description includes drawings, wherein.

Figure 1:
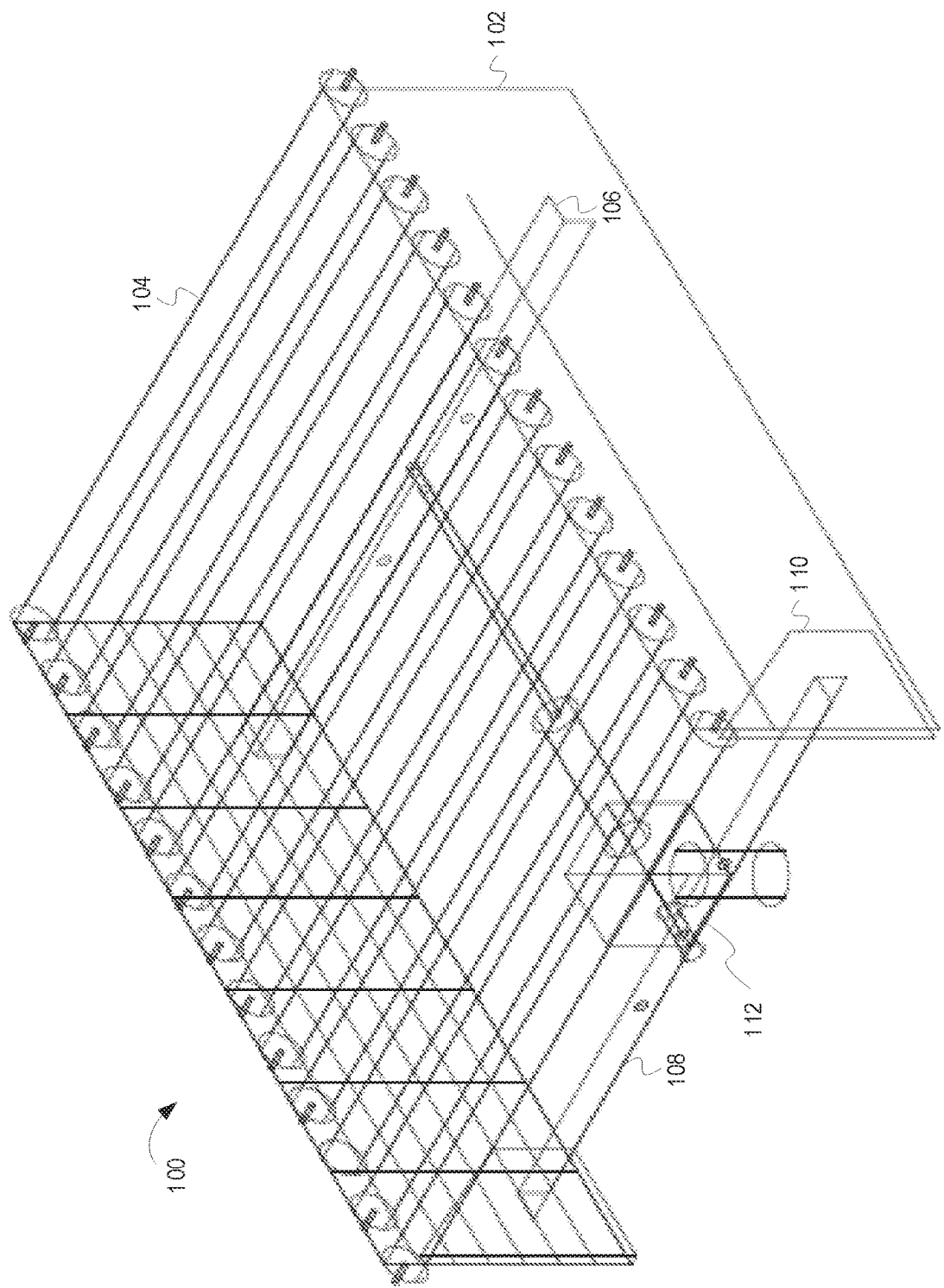
FIG. 1 is an isometric view of a liftgate 100 including an actuator 112, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to conveyor systems including liftgates. In some embodiments, a conveyor system including a liftgate comprises a conveyor section, wherein the conveyor section includes a plurality of rollers, a liftgate section, wherein the liftgate section comprises a frame having a proximal end and a distal end, wherein the frame includes sidewalls, a plurality of liftgate rollers, wherein the plurality of liftgate rollers are positioned within the frame, a front bracket and a rear bracket, wherein the front bracket is positioned between the sidewalls, wherein the front bracket is positioned toward the proximal end and the rear bracket is positioned toward the distal end, and wherein the rear bracket is pivotably affixed to the conveyor section, and an actuator, wherein the actuator is affixed to the rear bracket and the front bracket, wherein the actuator is configured to provide a linear force acting between the rear bracket and the front bracket, wherein the linear force causes the proximal end of the liftgate portion to raise with respect to the conveyor section.

As previously discussed, many facilities utilize conveyor systems to move objects, such as packages. Additionally, some conveyor systems include liftgates that allow people to move across the conveyor system quickly. However, current liftgates have many drawbacks. First, liftgates are typically difficult to operate due to their size and weight. Though existing liftgates use springs to bias liftgates open, this only does so much to make the liftgates more usable. That is, the liftgates are still heavy and difficult to manipulate. Additionally, these liftgates pose serious safety risks. For example, a liftgate may fall while a person is under it, injuring the person.

Described herein are system, methods, and apparatuses that seek to minimize, if not eliminate, these drawbacks. In one embodiment, a liftgate is provided with an actuator. The actuator is mounted on the liftgate and/or conveyor system and is configured to raise the liftgate. Such liftgates may be easier to operate because they need not be manually raised and lowered. Additionally, in some embodiments, the liftgates may include, or have inherent in their design, safety features that prevent unintended movement of the liftgate and prevent the liftgate from falling. The discussion of FIGS. 1 and 2A-2B provide an overview of a such a liftgate, according to some embodiments.

Figure 2A:
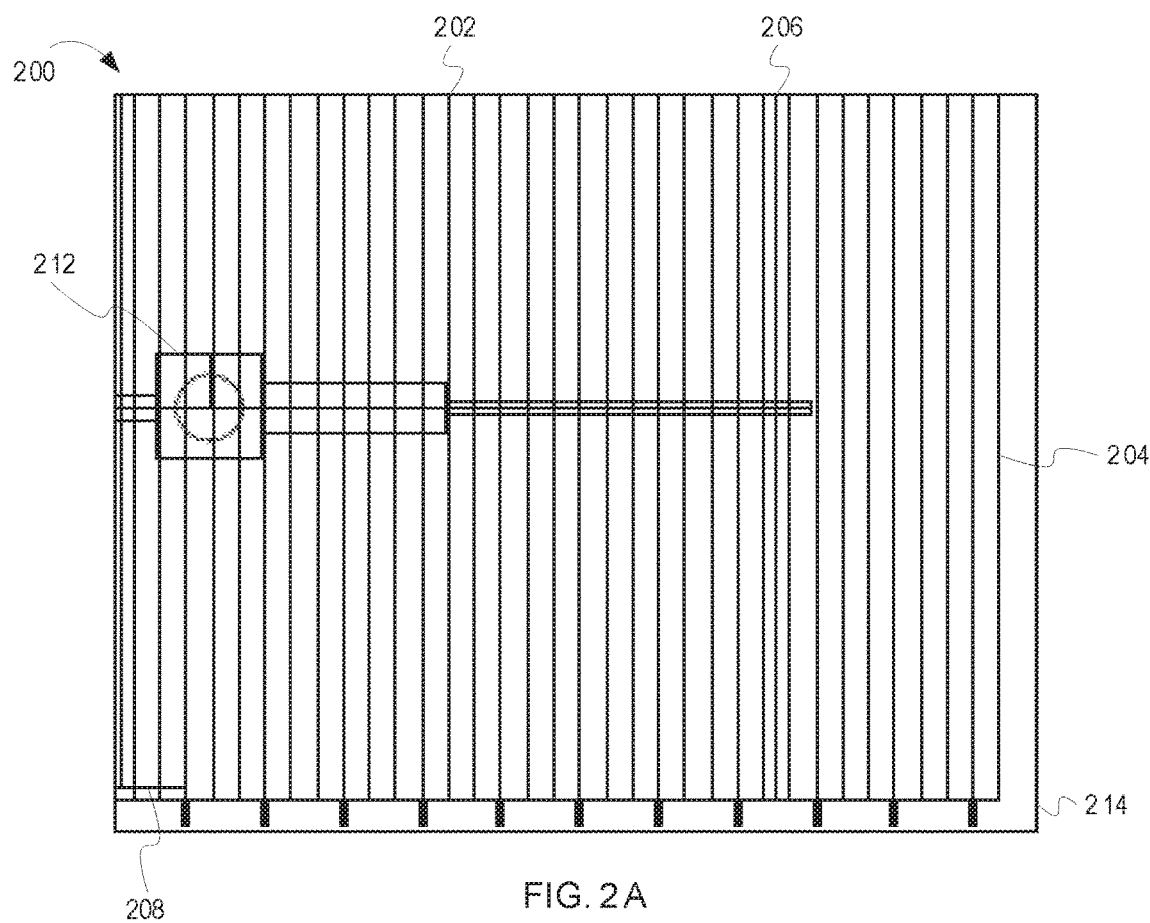
FIG. 2A is an overhead view of a liftgate 200 including an actuator 212, according to some embodiments.
Figure 2B:
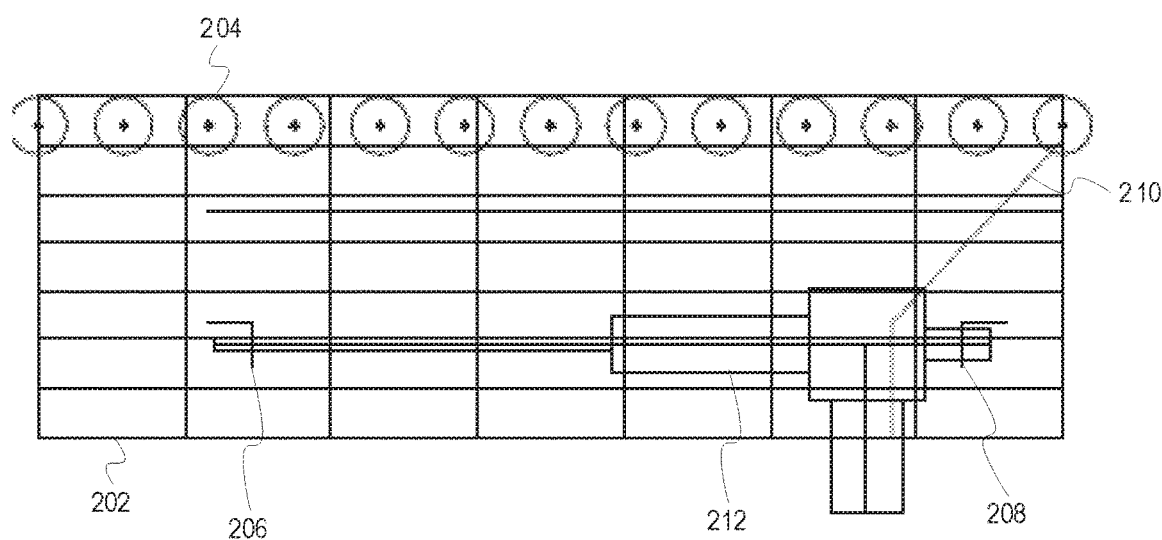
FIG. 2B is a profile view of a liftgate 200 including an actuator 212, according to some embodiments.

FIG. 1 is an isometric view of a liftgate 100 including an actuator 112, according to some embodiments. The liftgate 100 is located adjacent to, between, etc. conveyor sections (not shown). The liftgate 100 raises to allow persons to cross the conveyor. For example, the liftgate 100 can be attached to the conveyor section via a hinge such that one end of the liftgate 100 raises with respect to the conveyor section.

The liftgate 100 includes sidewalls 102. The sidewalls 102 extend from a frame (as shown in FIG. 2A). The liftgate 100 includes a conveyor mechanism disposed between the sidewalls 102. As depicted in FIG. 1, the conveyor mechanism includes rollers 104 (referred to as "liftgate rollers," whereas the conveyor section includes "conveyor rollers"). Although the conveyor mechanism depicted in the example of FIG. 1 includes rollers 104, embodiments are not so limited. That is, the conveyor mechanism can be of any suitable type. For example, the conveyor mechanism may include a belt, wheels, balls, etc. Additionally, in some embodiments, the conveyor mechanism, such as the rollers 104, can be powered. In such embodiments, the conveyor mechanism, and accordingly, the liftgate 100 and/or the conveyor section can include the necessary hardware to power the conveyor mechanism (e.g., motors, belts, chains, pulleys, circuitry, etc.).

The liftgate 100 includes the actuator 112. The actuator is configured to raise at least a portion of the liftgate 100. For example, as previously discussed, the liftgate 100 may be pivotably affixed to the conveyor section. In such embodiments, the actuator 112 causes one end of the liftgate 100 to raise with respect to the conveyor section. The actuator 112 is mounted to the liftgate 100 and/or conveyor section via brackets. As depicted in FIG. 1, the liftgate 100 includes two brackets: a rear bracket 108 and a front bracket 106. The actuator 112 provides a force between the rear bracket 108 and the front bracket 106 to raise the liftgate 100.

As depicted in FIG. 1, the rear bracket 108 is affixed to the conveyor section via conveyor brackets 110. The front bracket 106 is affixed to the sidewalls 102. To allow the liftgate 100 to raise, one of the brackets is pivotably affixed to the conveyor section and/or the sidewalls 102. In the example depicted in FIG. 1, the rear bracket is pivotably coupled to the conveyor brackets 110. Accordingly, during actuation, the rear bracket 108 pivots as the liftgate 100 rises. Though the example depicted in FIG. 1 includes a pivotable rear bracket 108, embodiments are not so limited. For example, in some embodiments, the front bracket 106 may rotate in addition to, or in lieu of, the rear bracket 108. The rear bracket 108 is positioned toward a distal end of the liftgate 100 (i.e., within the rear half of the liftgate 100) and the front bracket 106 is positioned toward a proximal end of the liftgate (i.e., within the front half of the liftgate 100).

Additionally, in some embodiments, the liftgate 100 can include one or more springs to bias the actuator open or closed. For example, the one or more springs can be coupled to the rear bracket 108, the front bracket 106, the frame, the sidewalls 102, and/or the conveyor section. In one embodiment, the one or more springs bias the liftgate 100 closed (i.e., the one or more springs provide a force in a direction opposite of the actuator 112). Such a configuration may help maintain the liftgate 100 in a level, or near level, position with respect to the conveyor section. In another embodiment, the one or more springs may bias the liftgate 100 open, aiding the actuator 112 in opening the liftgate 100/

While FIG. 1 provides an isometric view of a liftgate including an actuator, FIGS. 2A and 2B provide alternate views of such a liftgate.

FIG. 2A is an overhead view of a liftgate 200 including an actuator 212 and FIG. 2B is a profile view of the liftgate 200, according to some embodiments. As with the liftgate depicted in FIG. 1, the liftgate 200 depicted in FIGS. 2A and 2B includes a frame 214, a conveyor mechanism (i.e., rollers 204), sidewalls 202, a rear bracket 208, a front bracket 206, and an actuator 212. Additionally, conveyor brackets 210 can be seen in FIG. 2B.

Figure 3:
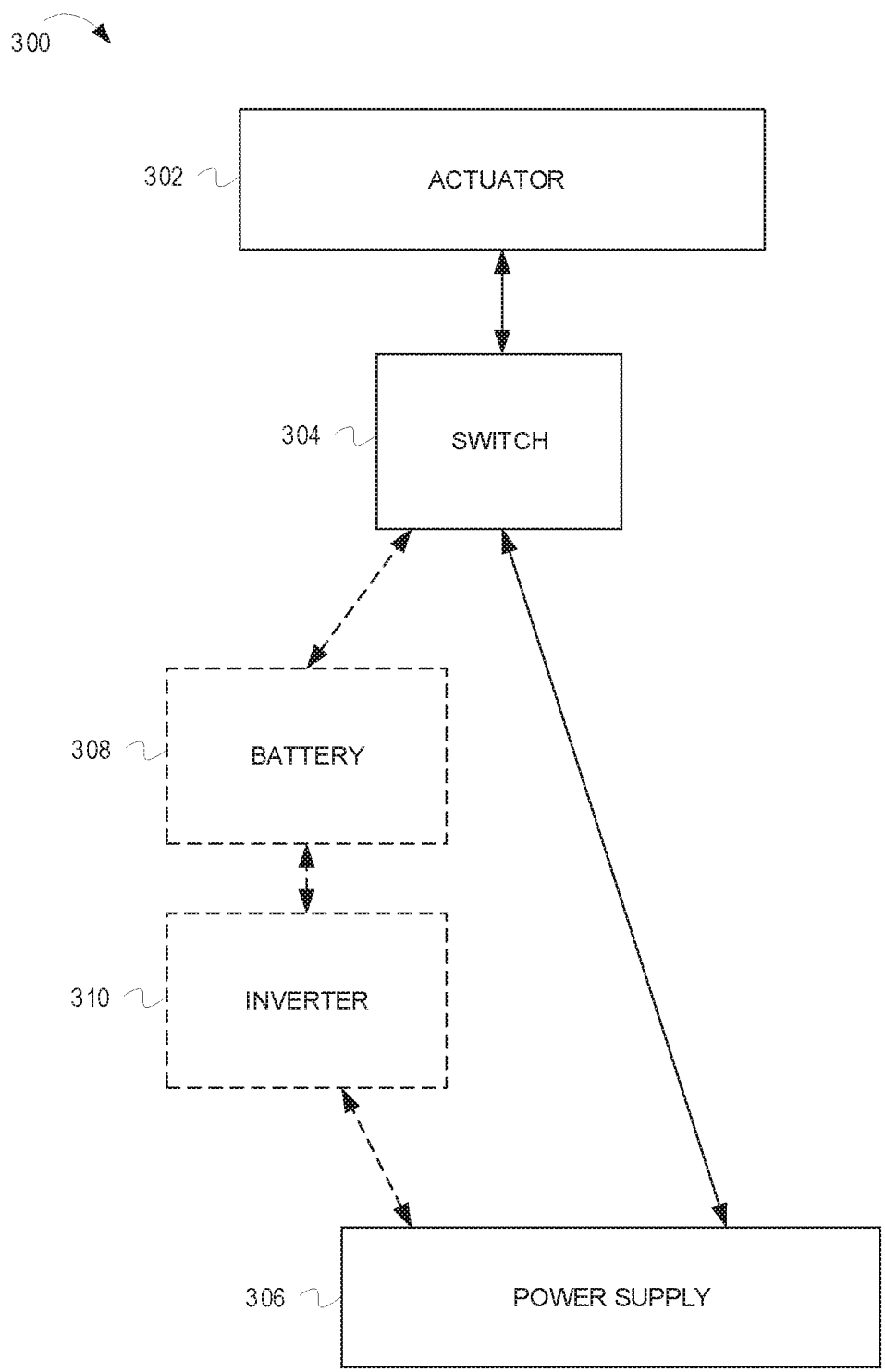
FIG. 3 is a block diagram of a system 300 including an actuator 302 for raising a liftgate, according to some embodiments.

FIG. 3 is a block diagram of a system 300 including an actuator 302 for raising a liftgate, according to some embodiments. The system includes an actuator 302, a switch 304, a power supply 306, an optional battery 308 and an optional inverter 310.

The actuator 302 can be of any type suitable to raise and/or lower a liftgate. For example, in one embodiment, the actuator 302 can be a linear actuator. Additionally, the actuator 302 can be powered by any suitable mechanism. For example, the actuator 302 can be an electrical actuator (DC and/or AC), a pneumatic actuator, a hydraulic actuator, etc. In the case of a pneumatic or hydraulic actuator, the system 300 can include any necessary components, such as pneumatic/hydraulic compressors and/or pneumatic/hydraulic reservoirs which may replace, or work in conjunction with, the power supply. In some embodiments, an electrical actuator may be preferred in that electrical actuators are not susceptible to pressure losses and in the event of a power loss, an electrical actuator may prevent the liftgate from falling. In a preferred embodiment, the actuator 302 is a screw-type electrical linear actuator.

The power supply 306 provides power to the actuator 302. For example, the power supply 306 can be a standard 120V AC power supply, a 12V DC power supply, or any other suitable type. The power supply 306 can provide power directly to the actuator (e.g., in the case of an electrical linear actuator) and/or supply power to other devices used to operate the actuator (e.g., a compressor in the case of a pneumatic or hydraulic actuator).

The switch 304 controls operation of the actuator 302, and thus controls the position of the liftgate (e.g., between open and closed positions). In the case of an electrical actuator, the switch 304 can be disposed in a circuit between the power supply 306 and the actuator 302 to control the flow of electricity to the actuator 302. In the case of a hydraulic or pneumatic actuator, the switch 304 can be coupled to a compressor or other motor to cause the movement of fluid into, or out of, the actuator 302. Accordingly, the switch 304 can be of any suitable type. For example, the switch 304 can be a simple on/off switch, a rocker switch, a toggle switch, etc. Additionally, in some embodiments, the switch 304 can be a momentary switch. Use of a momentary switch may provide a safety benefit that decreases the likelihood of unintended operation.

As previously discussed, the system 300 can include the optional battery 308 and the optional inverter 310. The battery 308 and the inverter 310 are disposed electrically between the power supply 306 and the actuator 302. The inverter may not be necessary if the power supply 306 provides DC power. If the power supply 306 provides AC power, the inverter 310 converts the AC power provided by the power supply 306 to DC power usable by the battery 308. The battery 308 provides DC power to the actuator 302. Inclusion of the battery 308 and the inverter 310 may allow the system 300 to operate, for at least a period of time, if power is lost (i.e., the battery 308 acts as backup power source). Additionally, in some embodiments, the system 300 may include a capacitor (not shown) in addition to, or in lieu of, the battery 308 to provide power (e.g., if the actuator 302 produces a large load).

Figure 4:
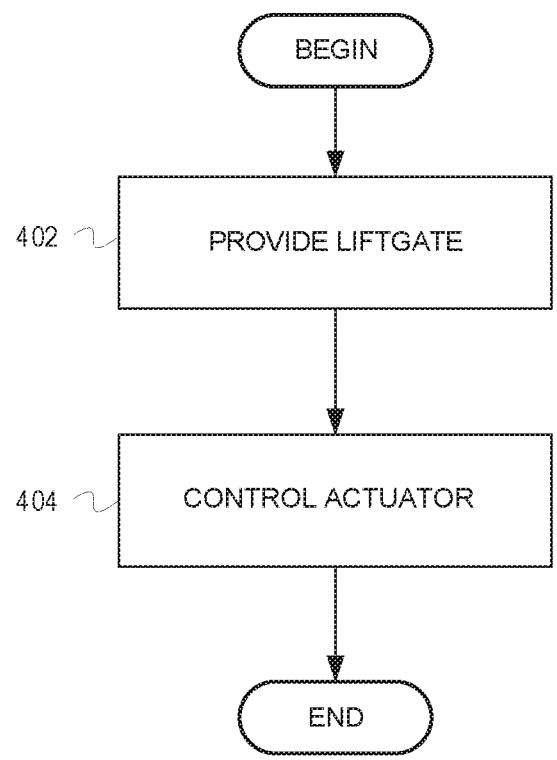
FIG. 4 is a flowchart depicting example operations for operation of a liftgate for a conveyor system, according to some embodiments.

While the discussion of FIG. 3 provides additional detail regarding a system including a liftgate having an actuator, the discussion of FIG. 4 describes operating a liftgate for a conveyor system.

FIG. 4 is a flowchart depicting example operations for operation of a liftgate for a conveyor system, according to some embodiments. The flow begins at block 402.

At block 402, a liftgate is provided. The liftgate includes an actuator (e.g., an electrical, pneumatic, hydraulic, etc. actuator). The actuator is configured to provide a force to lift at least a portion of the liftgate with respect to a conveyor section. For example, the actuator can lift one end of the liftgate. The conveyor is mounted to the liftgate and/or the conveyor section via brackets. The actuator lifts the liftgate via a force provided between the brackets. The flow continues at block 404.

At block 404, the actuator is controlled. For example, the actuator can be controlled via a switch. The switch can be electrically (e.g., communicatively) coupled to the actuator and/or a control mechanism for the actuator (e.g., a compressor).

In some embodiments, a conveyor system including a liftgate comprises a conveyor section, wherein the conveyor section includes a plurality of rollers, a liftgate section, wherein the liftgate section comprises a frame having a proximal end and a distal end, wherein the frame includes sidewalls, a plurality of liftgate rollers, wherein the plurality of liftgate rollers are positioned within the frame, a front bracket and a rear bracket, wherein the front bracket is positioned between the sidewalls, wherein the front bracket is positioned toward the proximal end and the rear bracket is positioned toward the distal end, and wherein the rear bracket is pivotably affixed to the conveyor section, and an actuator, wherein the actuator is affixed to the rear bracket and the front bracket, wherein the actuator is configured to provide a linear force acting between the rear bracket and the front bracket, wherein the linear force causes the proximal end of the liftgate portion to raise with respect to the conveyor section.

In some embodiments, a liftgate for use with a conveyor system comprises a frame, wherein the frame includes sidewalls, a conveyor mechanism, wherein the conveyor mechanism is coupled to the frame, a front bracket, wherein the front bracket is coupled to a front portion of the frame via the sidewalls, a rear bracket, wherein the rear bracket is located at a rear portion of the frame, and a linear actuator, wherein the linear actuator is coupled to the front bracket and the rear bracket, and wherein the linear actuator is configured to provide a force between the front bracket and the rear bracket to lift the front portion of the frame.

In some embodiments, an apparatus and a corresponding method performed by the apparatus comprises providing the liftgate, wherein the liftgate is coupled to the conveyor system and includes a linear actuator, wherein the linear actuator is configured to raise the liftgate with respect to the conveyor system and controlling, via a switch, actuation of the linear actuator to raise the liftgate with respect to the conveyor system.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A conveyor system including a liftgate, the conveyor system comprising:
    a conveyor section, wherein the conveyor section includes a plurality of conveyor rollers;
    a liftgate section, wherein the liftgate section comprises:
        a frame having a proximal end and a distal end, wherein the frame includes sidewalls;
        a plurality of liftgate rollers, wherein the plurality of liftgate rollers are positioned within the frame;
        a front bracket and a rear bracket, wherein the front bracket is positioned between the sidewalls, wherein the front bracket is positioned toward the proximal end and the rear bracket is positioned toward the distal end, and wherein the rear bracket is pivotably affixed to the conveyor section; and
        an actuator, wherein the actuator is affixed to the rear bracket and the front bracket, wherein the actuator is configured to provide a linear force acting between the rear bracket and the front bracket, wherein the linear force causes the proximal end of the liftgate portion to raise with respect to the conveyor section.

2. The conveyor system of claim 1, further comprising:
    a switch, wherein the switch is communicatively coupled to the actuator.

3. The conveyor system of claim 1, wherein the actuator is an electrical linear actuator.

4. The conveyor system of claim 3, wherein the electrical linear actuator is powered by direct current (DC) electricity.

5. The conveyor system of claim 4, further comprising:
    an inverter, wherein the inverter is configured to convert alternating current (AC) electrical power to DC electrical power; and
    a battery, wherein the battery is electrically located between the electrical linear actuator and the inverter, and wherein the battery is configured to provide backup power to the electrical linear actuator.

6. The conveyor system of claim 3, wherein the electrical linear actuator is a screw-type electrical linear actuator.

7. The conveyor system of claim 1, wherein the actuator is a hydraulic linear actuator.

8. The conveyor system of claim 7, further comprising:
    a hydraulic compressor; and
    a hydraulic reservoir.

9. The conveyor system of claim 1, wherein the actuator is a pneumatic actuator.

10. The conveyor system of claim 9, further comprising:
    a pneumatic compressor; and
    a pneumatic reservoir.

11. A liftgate for use with a conveyor system, the liftgate comprising:
    a frame, wherein the frame includes sidewalls;
    a conveyor mechanism, wherein the conveyor mechanism is coupled to the frame;
    a front bracket, wherein the front bracket is coupled to a front portion of the frame via the sidewall s;
    a rear bracket, wherein the rear bracket is located at a rear portion of the frame, and wherein the rear bracket is affixed to the conveyor system; and
    a linear actuator, wherein the linear actuator is coupled to the front bracket and the rear bracket, wherein the linear actuator is configured to provide a force between the front bracket and the rear bracket to lift the front portion of the frame.

12. The liftgate of claim 11, wherein at least one of the front bracket and the rear bracket are pivotably coupled to one of the frame and the conveyor system.

13. The liftgate of claim 11, wherein the linear actuator is one of an electrical actuator, a hydraulic actuator, and a pneumatic actuator.

14. The liftgate of claim 11, further comprising:
    a switch, wherein the switch is communicatively coupled to the linear actuator, and wherein the switch is configured to control movement of the linear actuator.

15. The liftgate of claim 14, wherein the conveyor mechanism comprises one or more of rollers and a belt.

16. The liftgate of claim 11, further comprising:
    at least one spring, wherein the spring is coupled to at least one of the front bracket and the rear bracket, wherein the spring is configured to provide a force in a direction different than that of the linear actuator.

17. A method of operation of a liftgate for a conveyor system, the method comprising:
- providing the liftgate, wherein the liftgate is coupled to the conveyor system and includes a linear actuator, wherein the linear actuator is configured to raise the liftgate with respect to the conveyor system, and wherein the liftgate comprises:
  - a frame having a proximal end and a distal end, wherein the frame includes sidewalls;
  - a plurality of liftgate rollers, wherein the plurality of liftgate rollers are positioned within the frame;
  - a front bracket and a rear bracket, wherein the front bracket and rear bracket are positioned between the sidewalls, wherein the front bracket is positioned toward the proximal end and the rear bracket is positioned toward the distal end, and wherein the rear bracket is pivotably affixed to the conveyor system; and
  - the actuator, wherein the actuator is affixed to the rear bracket and the front bracket; and
- controlling, via a switch, actuation of the linear actuator to raise the liftgate with respect to the conveyor system.

18. The method of claim 17, wherein the actuator is one of an electrical actuator, a hydraulic actuator, and a pneumatic actuator.

19. The method of claim 17, wherein the switch is a momentary switch.

\* \* \* \* \*

UNITED STATES PATENT AND TRADEMARK OFFICE
CERTIFICATE OF CORRECTION

PATENT NO. : 11,001,448 B2  
APPLICATION NO. : 16/714086  
DATED : May 11, 2021  
INVENTOR(S) : Paul M. Parmenter It is certified that error appears in the above-identified patent and that said Letters Patent is hereby corrected as shown below:

In the Specification

Column 6, Line 42, delete "sidewall s" and insert --sidewalls--, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*